(12) United States Patent
Bo

(10) Patent No.: US 6,206,052 B1
(45) Date of Patent: Mar. 27, 2001

(54) APPARATUS AND METHOD FOR FORMING A WINDING FOR A STATOR OF A DYNAMOELECTRIC MACHINE

(75) Inventor: Mario Bo, Turin (IT)

(73) Assignee: Pavesi S.r.l., Turin (IT)

( * ) Notice: Subject to any disclaimer, the term of this patent is extended or adjusted under 35 U.S.C. 154(b) by 0 days.

(21) Appl. No.: 09/348,551

(22) Filed: Jul. 7, 1999

(30) Foreign Application Priority Data

Jul. 15, 1998 (IT) .............................................. TO98A0617

(51) Int. Cl.[7] ........................................................ B21F 3/00
(52) U.S. Cl. ............................................................ 140/92.1
(58) Field of Search .............................................. 140/92.1

(56) References Cited

U.S. PATENT DOCUMENTS

| 3,346,021 | 10/1967 | Ross | 140/92.2 |
|---|---|---|---|
| 3,672,040 | * 6/1972 | Arnold | 140/92.1 |
| 5,251,678 | 10/1993 | Orecchia | 140/92.1 |
| 5,647,405 | 7/1997 | Fichtner et al. | 140/92.1 |

FOREIGN PATENT DOCUMENTS

| 572 291 | 1/1976 | (CH) | H02K/15/04 |
|---|---|---|---|
| 37 29 289 A1 | 3/1989 | (DE) | H02K/15/04 |

* cited by examiner

Primary Examiner—Lowell A. Larson
(74) Attorney, Agent, or Firm—Fish & Neave; Robert R. Jackson; Dona C. Edwards

(57) ABSTRACT

An apparatus for forming a winding for a stator of a dynamoelectric machine comprises a form (3) and a rotating unit (11) for winding a wire (W) around the form (3). The form (3) comprises two form sections (4) which are movable toward and away from each other along a direction orthogonal to the form axis (5). The apparatus further comprises motorized means (37b, 34, 32) for controlling the relative movement of said form sections (4), which can be activated even while the winding unit (11) is being rotated.

17 Claims, 10 Drawing Sheets

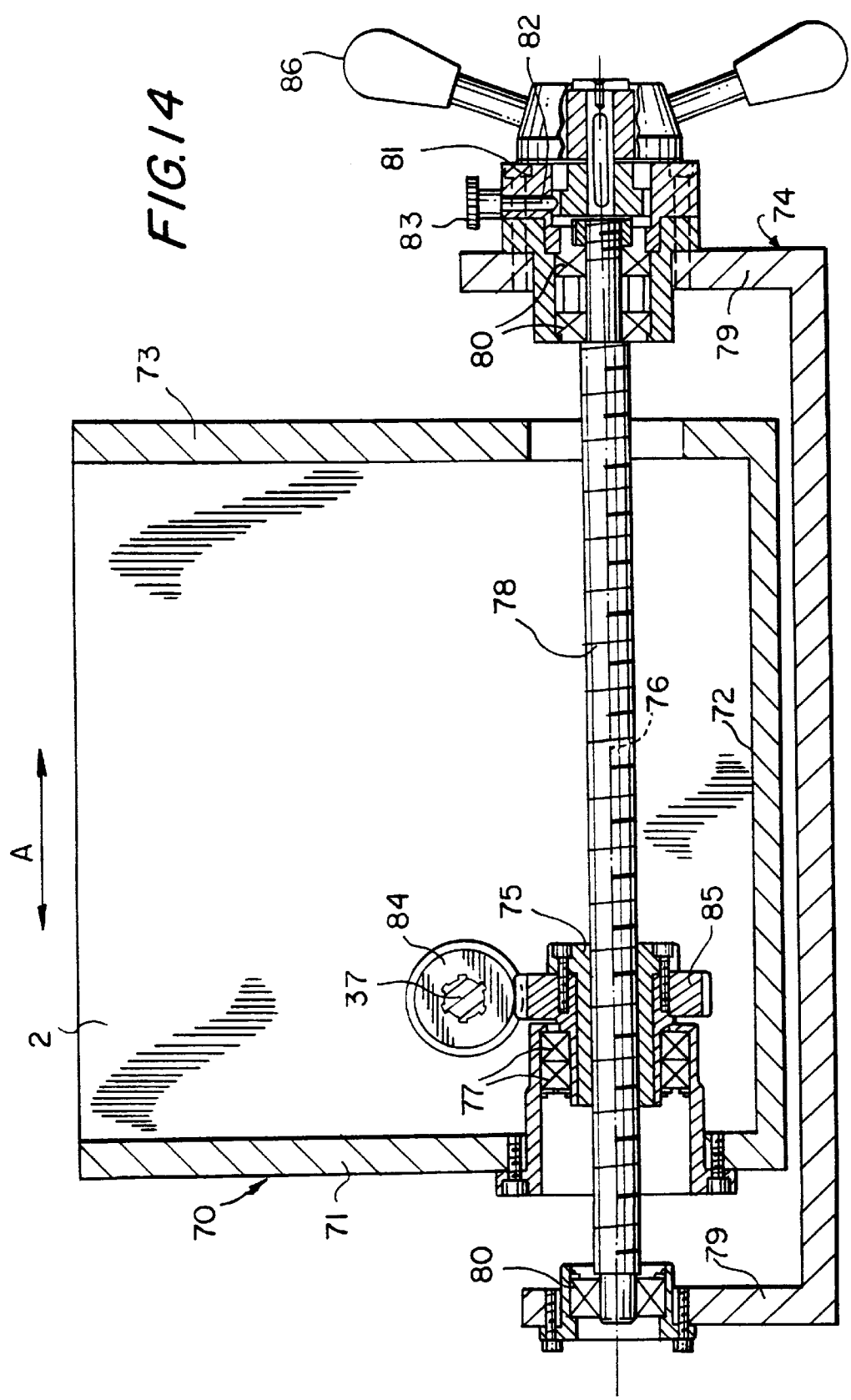

APPARATUS AND METHOD FOR FORMING A WINDING FOR A STATOR OF A DYNAMOELECTRIC MACHINE

BACKGROUND OF THE INVENTION

The present invention is directed to an apparatus for forming a winding for a stator of a dynamoelectric machine, of the type comprising:

a supporting structure, a form carried by the supporting structure, on which a wire is to be wound for forming a winding, and a rotatable unit, rotatably supported by the supporting structure around a central axis of the form, for winding the wire around said form in order to form the winding, wherein said form comprises two form sections movable toward and away from each other in a direction orthogonal to the form axis.

In the apparatus of the above indicated type which have been made heretofore, the relative displacement between the two form sections along a direction orthogonal to the form axis is driven manually or with the aid of a motorized auxiliary unit, when the apparatus is inoperative, by actuating adjustable screws provided on the form in order to adjust the size of the form and hence the windings obtained thereby. This operation is relatively troublesome and further implies a loss of productivity of the apparatus, due to the increase in the apparatus down-time.

SUMMARY OF THE INVENTION

It is an object of the invention to overcome the above-mentioned drawback. The invention achieves this object by providing an apparatus of the above indicated type, characterized in that it includes motorized means for driving the relative movement of the two form sections which are adapted to be activated even while the winding unit is being rotated.

The inventor has discovered with surprise that the adjustment of the form size while the winding operation is being carried out may become a desirable feature, in view of obtaining a coil formed by turns of variable length. With this feature, it is possible, for example, to provide a coil so as to save wire length where possible and also improve the performance of an electric motor obtained thereby. Realizing the existence of this problem and providing the above indicated solution represents the essence of the present invention. None of the apparatus made heretofore is able to adjust the form size while the winding is being formed, as it is possible with the apparatus according to the invention.

In a preferred embodiment, the two form sections are slidably mounted along the direction of their relative movement on a frame carried by said supporting structure, and said motorized means for driving the movement of the form sections includes a rod arranged along the form axis and having two opposite rack-like surfaces which mesh with two sprockets driving a synchronous and symmetric movement of the two form sections with the aid of two respective screw-and-nut systems, the apparatus further comprising means for driving movement of said rod along its axis.

The invention is also directed to the winding forming method which is carried out by the apparatus according to the invention, whose main feature lies in that a relative movement of the two form sections is driven, in order to vary the form size, while the winding operation is being carried out.

BRIEF DESCRIPTION OF THE DRAWINGS

A preferred embodiment of the invention will now be described with reference to the annexed drawings, given purely by way of non-limiting example, in which:

FIG. 14 is a view of a further detail of the apparatus according to the invention, in cross-section, taken along line XIV—XIV of FIG. 1.

DESCRIPTION OF A PREFERRED EMBODIMENT OF THE INVENTION

Figure 1:
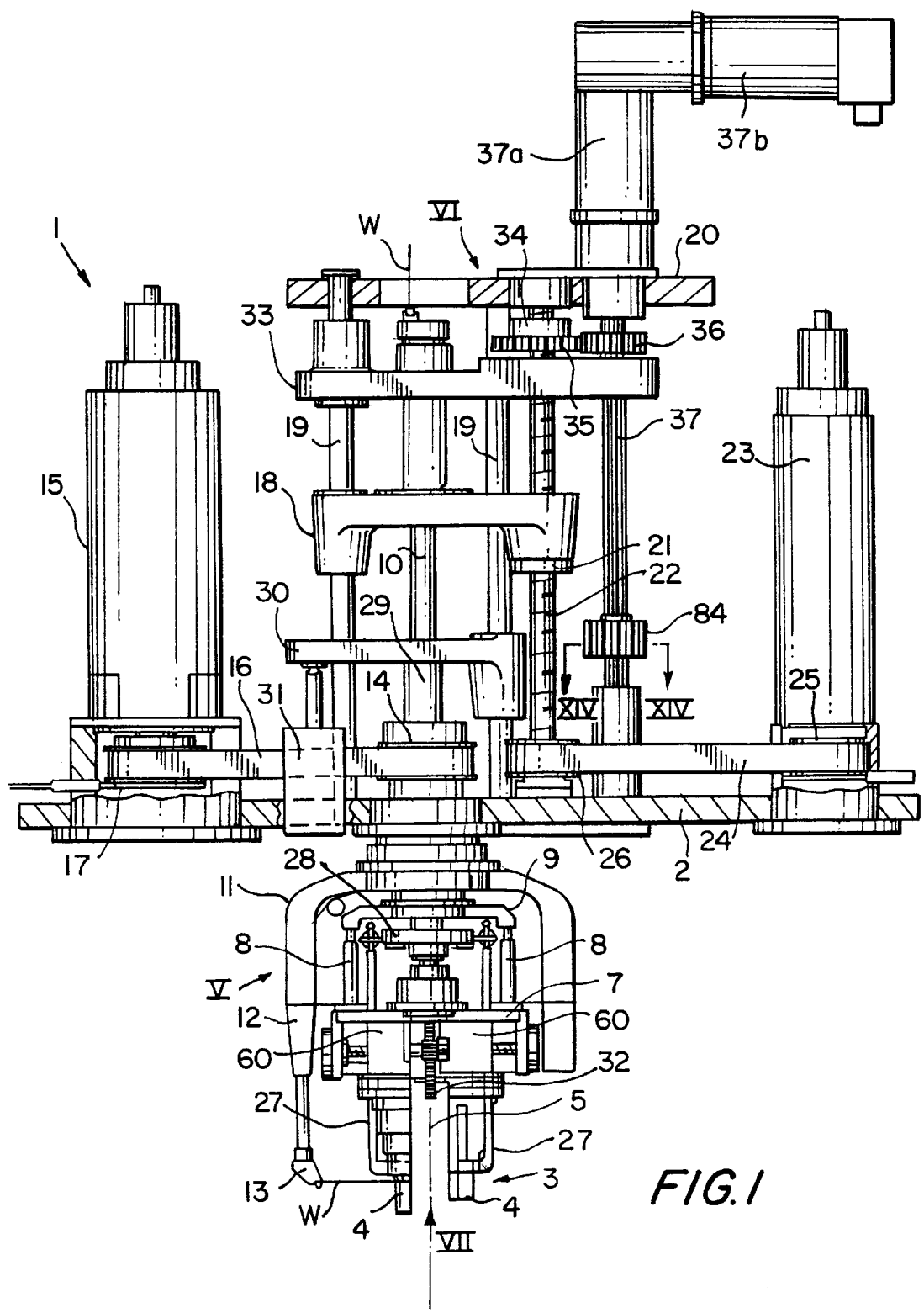
FIG. 1 is a diagrammatic side elevational view of the apparatus according to the invention, in a first condition of operation.

In the drawings, reference numeral 1 generally designates an apparatus for forming windings for stators of dynamoelectric machines, such as asynchronous electric motors. Apparatus 1 comprises a wall 2 forming part of a supporting structure. Reference numeral 3 designates a form carried by wall 2, on which a wire is to be wound for forming the winding. According to a known technique, form 3 comprises two form sections 4 defining together a tapered stepped body having an axis 5. The two form sections 4 are connected at the top to two blocks 60 which, as it will be described more in detail in the following, are carried by an auxiliary frame 7 so as to be movable towards and away from each other along a direction orthogonal to axis 5. In turn, frame 7 is slidably mounted on guiding columns 8 forming part of a supporting unit 9. The supporting unit 9 is connected to a shaft 10 whose axis is coincident with axis 5 and which is supported by wall 2, as it will be described in detail in the following, so that shaft 10 does not rotate, but is able to move axially relative to wall 2.

Reference numeral 11 designates a rotating unit for forming the winding, comprising a bell-like member 12 provided with an arm 13 for feeding a wire W, which is supplied to the machine from above, as also it will be described more in detail in the following. The bell-like member 12 of the rotating unit 11 is rotatably mounted around axis 5 on the wall 2 and is rigidly connected to a tubular shaft (which will be described in detail in the following) surrounding shaft 10 and carrying a pulley 14. The rotation of the winding unit 11 is driven by an electric motor 15 by means of a toothed belt 16 which meshes with the above mentioned pulley 14 and a pulley 17 rigidly mounted on the shaft of motor 15.

According to a known technique, form 3 is made with a stepped tapered surface for forming coils of different diameter in the various stages of the winding forming process. To this end, form 3 is movable axially relative to the feeding arm 13, so as to be able to receive the wire W on its various stepped portions, as a function of the relative position along the direction of axis 5 between form 3 and the feeding arm 13. The axial movement of form 3 is possible since, as already illustrated above, the shaft 10 carrying the form supporting unit 9 is movable axially relative to wall 2. At its upper end, shaft 10 is axially connected to a head 18 which is slidable on vertical guiding columns 19 which extend between wall 2 and an upper wall 20, which also forms part of the supporting structure of the apparatus. The head 18 also comprises a nut portion 21 which is engaged by a screw 22 whose ends are rotatably mounted within walls 2 and 20. The axial movement of head 18 is driven by an electric motor 23 and a toothed belt 24 connecting a pulley 25 directly driven by motor 23 to a pulley 27 rigidly mounted on screw 22. The actuation of motor 23 causes a rotation of screw 22, which in turn causes an axial movement of head 18. The axial movement of head 18 causes a corresponding axial movement of shaft 10 along with the unit 9 supporting form 3.

Also according to a known technique, once a winding coil has been formed on a stepped portion of form 3, this coil is expelled downwardly, following lowering of ejector members 27 which are inserted vertically through slots 28 (see FIG. 7) provided in the body of each form section 4, so as to push the coil downwardly, typically to a position in which it can be received by a known inserting device (not shown) adapted to insert the coil at a later stage into the slots of a stator of a dynamoelectric machine. The ejector members 27 are carried by a supporting unit 28, which in turn is carried (as will be described more in detail in the following) by a tubular shaft 29, which coaxially surrounds shaft 10 which in turn is surrounded by the shaft carrying the pulley 14 driving rotation of the winding unit. The shaft 29 is rigidly connected to a head 30 which is guided on the abovementioned guiding columns 19 and is movable along these guiding columns between two end positions by means of a fluid cylinder 31 whose body is connected to wall 2 and whose stem is connected to head 30. More precisely, the head 30 is movable between an inoperative raised position (shown in FIG. 1) and an operative lowered position (shown in FIG. 3) in which the ejector members 27 cause the coil formed on form 3 to be discharged.

According to the present invention, the apparatus 1 further comprises motorized means for adjusting the relative position of the two form sections 4 along the direction perpendicular to axis 5 of their relative movement toward and away from each other, even during rotation of the winding unit 11.

As will be described more in detail in the following, the relative movement along this direction of the two form sections 4 is driven, through a gear transmission, by a vertical rack rod 32, whose lower end is visible in FIG. 1. The rod 32 extends through the lower unit of the apparatus and through shaft 10 and is axially connected at its upper end to a head 33 which is also slidably guided on columns 19. The head 33, as it will be better described in the following, comprises a nut 34 which is rotatably mounted on head 33 and engaged by screw 22. A gear 35 is rigidly mounted on nut 34, which meshes with a further gear 36. Gear 36 is driven through a reducing unit 37a by an electric motor 37b for driving the adjusting movement of the two form sections 4.

In the regular operation of the apparatus, electric motor 37b is inactive. When the electric motor 23 is activated to cause form 3 to move axially, screw 22 is rotated, so as to cause the head 18 to move axially, as already illustrated, because of the engagement of nut 21 carried by head 18 on screw 22. At the same time, screw 22 also causes an axial movement of nut 34 carried by head 33. The head 33 is thus moved synchronously with head 18, so that there is no relative movement between the vertical rod 32 connected to head 33 and the form 3, the latter thus keeping its configuration. During movement of head 33, the gear 36 moves axially on a shaft 37 connected to electric motor 37b, which is a fluted shaft, so that gear 36 is connected in rotation to shaft 37 but is free to slide axially relative thereto.

Figure 2:
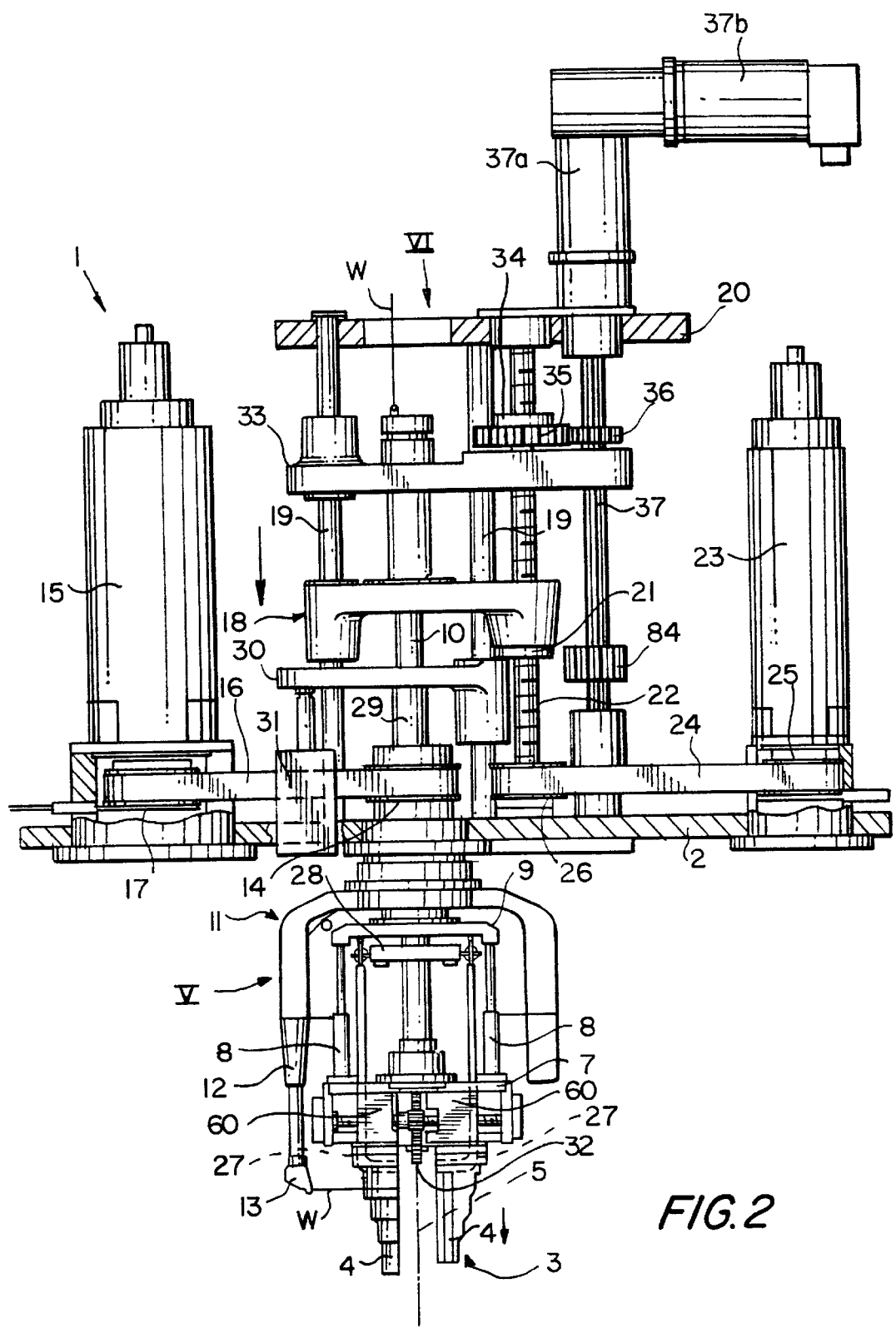
FIGS. 2, 3 and 4 are views corresponding to that of FIG. 1, which show the apparatus in further conditions of operation.

At the beginning of the winding forming process, the form 3 is in its raised position shown in FIG. 1. In this condition, the electric motor 15 is activated to cause rotation of the winding unit 11. The copper wire W is initially wound on one of the steps of smaller diameter of form 3. When the coil has been formed, form 3 is lowered by one level, to enable a new coil to be formed on the step adjacent to that used previously. The above-described operations are repeated until a coil is formed on one of the steps of greater diameter, as shown in FIG. 2. Electric motor 15 is deactivated and cylinder 31 is activated to cause lowering of head 30 along with the ejector members 27 which cause the winding to be discharged on the inserting device (not shown). As shown, in this condition, the heads 18 and 33 are lowered to their end positions. As already indicated, these lowering movements take place synchronously, following the actuation of electric motor 23 and hence of screw 22 which engages the nuts 21 and 34 carried by heads 18 and 33, respectively.

Figure 3:
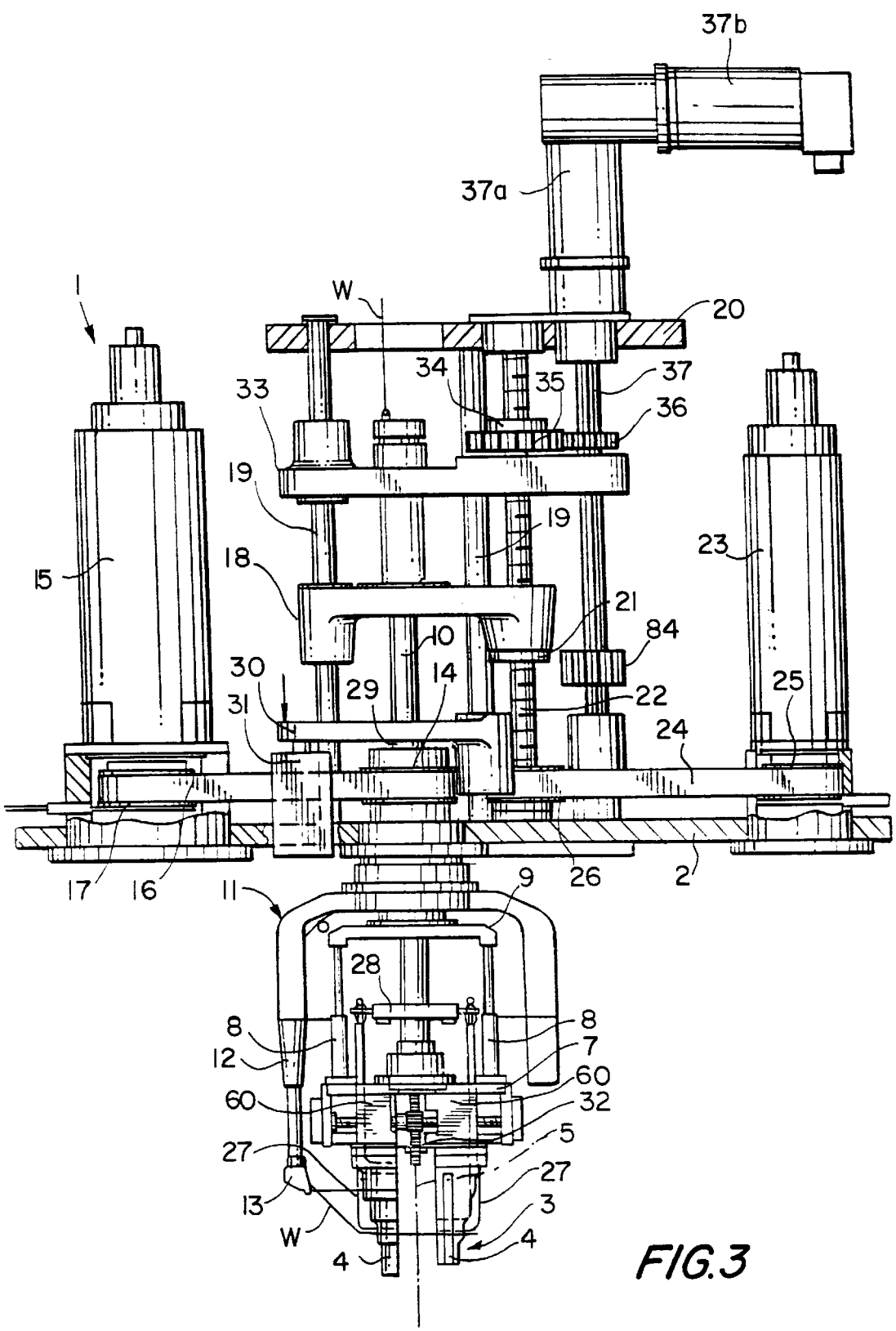
Figure 4:
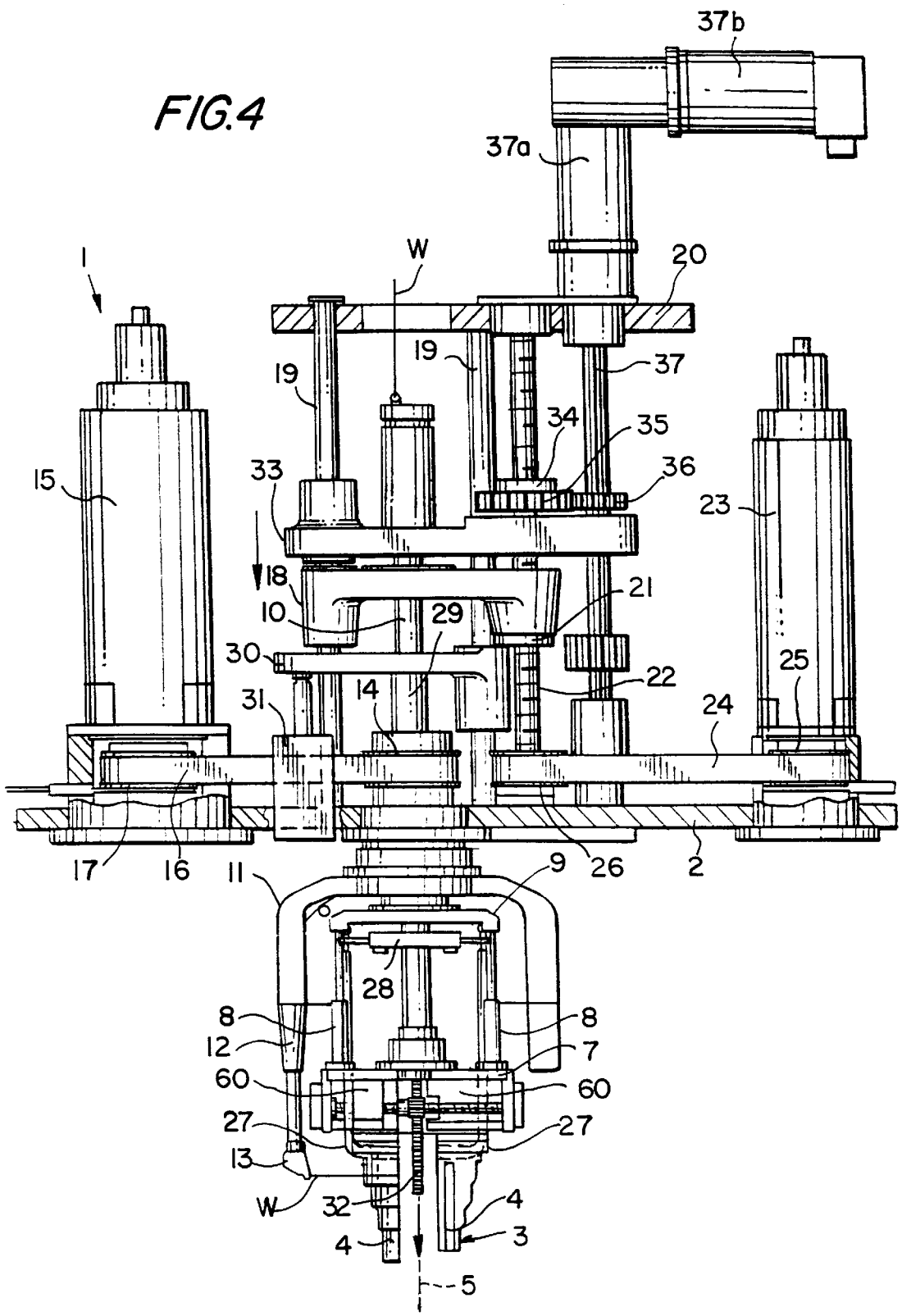

FIG. 3 shows the final stage in which, following forming of a coil on the form step of greater diameter, the cylinder 31 is actuated to cause discharge of the winding.

When instead it is desired to adjust the configuration of the form by moving the two form sections 4 toward and away from each other along a direction orthogonal to axis 5, electric motor 37b is actuated which drives rotation of nut 34 carried by head 33, through the gear pair 35 and 36. The nut 34 is then compelled to be screwed or unscrewed on screw 22, which is fixed with the electric motor 23 being inactive, so as to cause axial movement of the head 33 and the resulting axial movement of the rack rod 32. The transmission through which rod 32 causes the relative displacement of the two form sections 4 will be described more in detail in the following.

Figure 5:
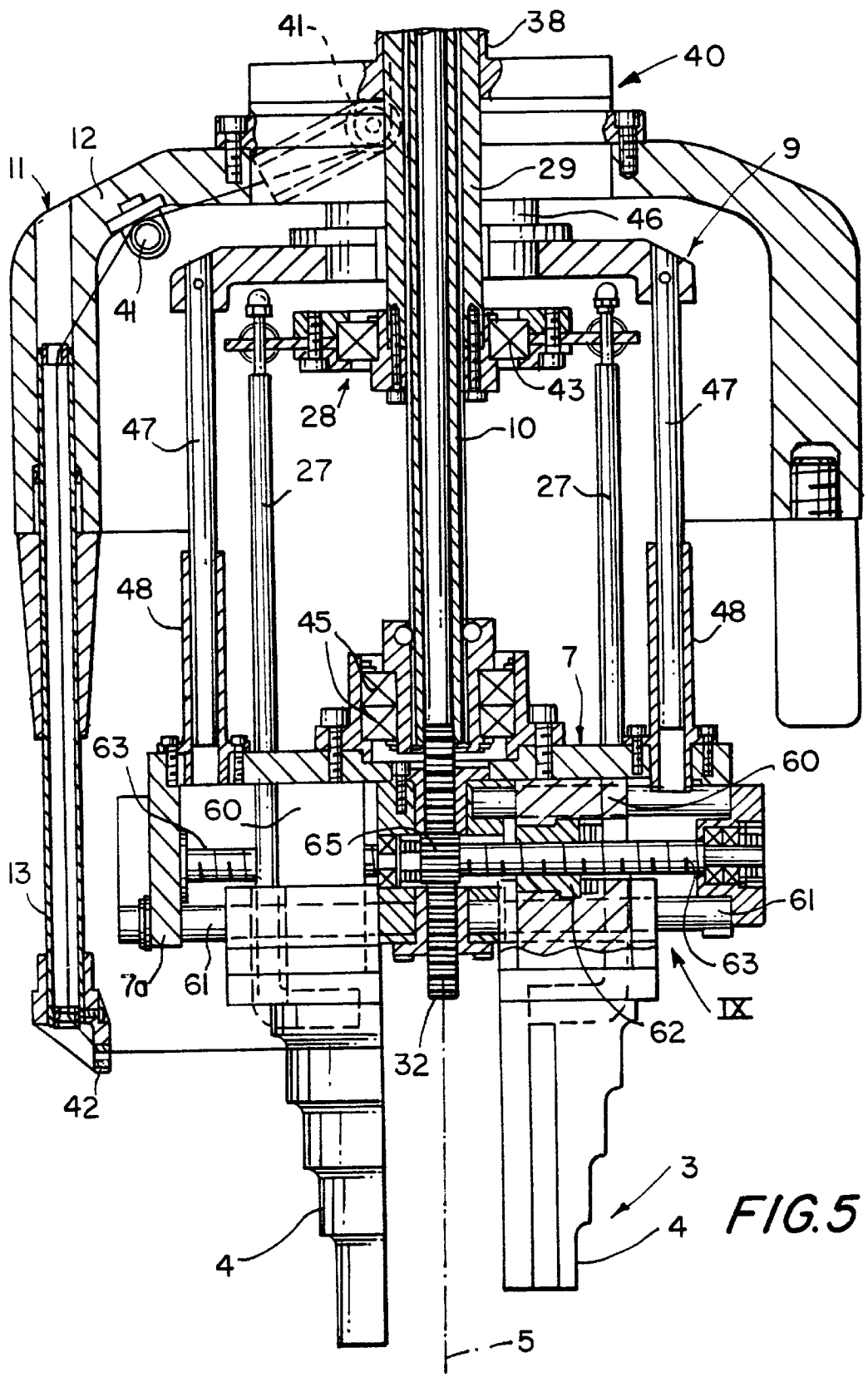
FIG. 5 is a view at an enlarged scale and in cross-section of the unit designated by arrow V in FIG. 1.
Figure 6:
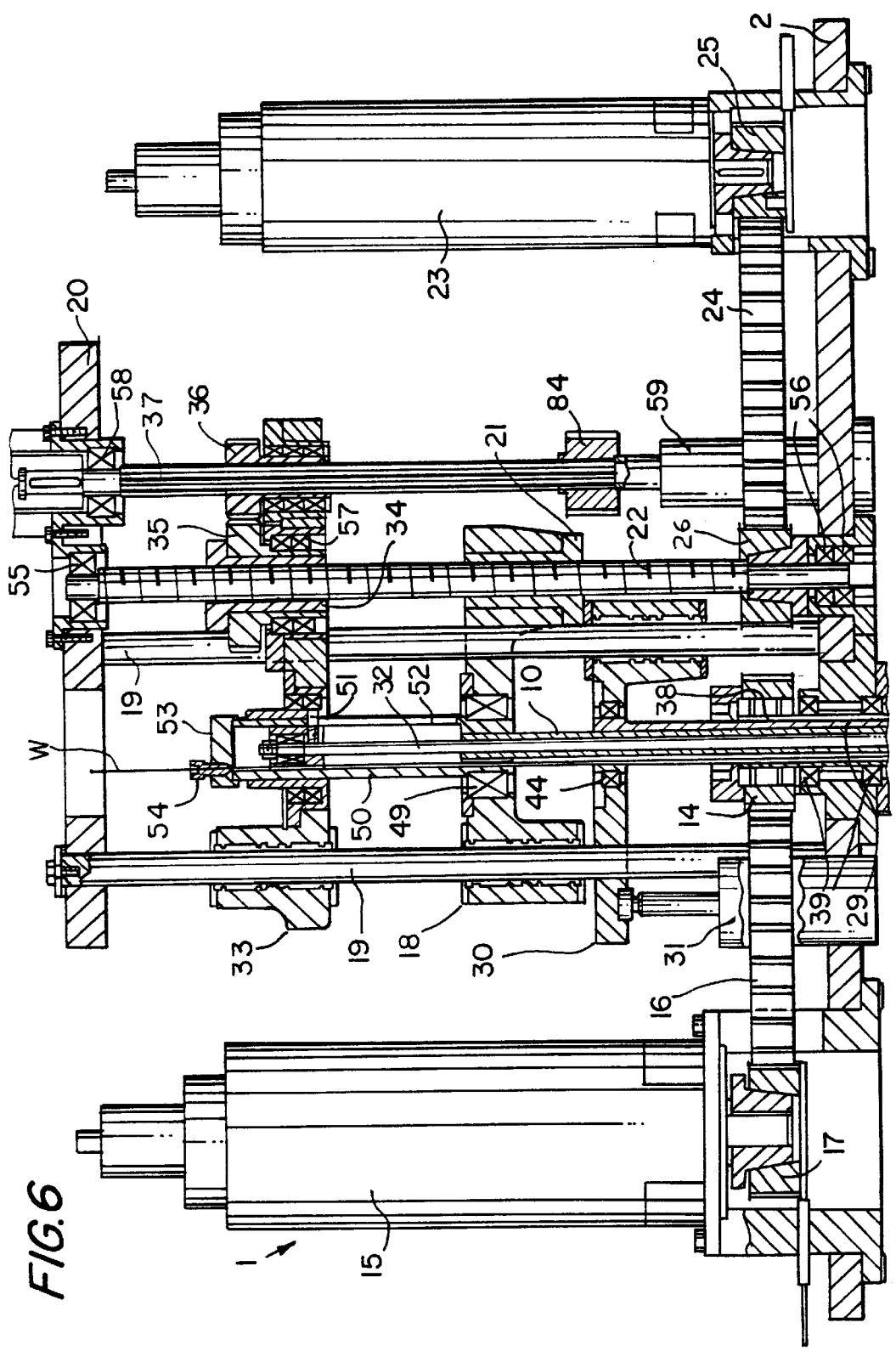
FIG. 6 is a view at an enlarged scale and in cross-section of the unit designated by arrow VI in FIG. 1, FIGS. 7 and 8 are a bottom view of the form of the apparatus according to the invention, taken along arrow VII of FIG. 1, in two different conditions of operation.

FIG. 6 shows the details of construction of the upper portion of the apparatus 1 at an enlarged scale. This figure clearly shows that wall 2 rigidly supports the electric motor 15. The pulley 17 driven by electric motor 15 and the toothed belt 16 connecting pulley 17 to pulley 14 are also clearly shown. Reference numeral 38 designates the tubular shaft on which toothed pulley 14 is rigidly mounted, which is rotatably supported by means of rolling bearings 39 by wall 2. The shaft 38 is rigidly connected to the body 40 of a conventional, commercially-available epicyclic-type reducing unit. As shown in FIG. 5, the body of the bell-like member 12 of the winding unit 11 is rigidly connected by means of screws to the body of reducing unit 40, which in turn is connected to shaft 38. Therefore, a rotation of the electric motor 15 causes the rotation of the winding unit 11 by means of the pulley 17, the toothed belt 16, the pulley 14, the shaft 38 and the body of the reducing unit 40. FIGS. 5 and 6 also clearly show how the copper wire W reaches the feeding arm 13. As shown, the wire W is guided adjacent to shaft 10, through the wall 2 and the reducing unit 40 and, by means of idle wheels 41, through the feeding arm 13 which has a tubular configuration and a feeding nozzle 42 arranged horizontally and facing toward axis 5. FIG. 5 also clearly shows the vertical arms of the two ejector members 27 and the associated supporting unit 28. As illustrated, the unit 28 comprises an outer ring rigidly connected to the ejector arms 27 which is mounted through a rolling bearing 43 on the tubular shaft 29. With reference to FIG. 6, the shaft 29 has its upper end secured to the head 30 with the interposition of a rolling bearing 44.

With reference to FIG. 5, the unit 9 supporting form 3 comprises a body 46 which is connected, in a known way, to the reducing unit 40. The known arrangement is such that the body 46 does not rotate even when shaft 38 of the winding unit 11 is rotated. This is a desired effect since form 3 must be kept motionless, while the winding unit 11 rotates therearound, notwithstanding the unit 9 supporting the form is supported coaxially within the rotating shaft 38. The supporting unit 9 comprises two vertical guiding columns 47 on which two bushes 48 are slidably mounted which are rigidly connected to the form-supporting frame 7. The latter is further connected, with the interposition of rolling bearings 45, to the lower end of shaft 10, which extends axially through the unit 28 supporting the ejector members 27, through the body 46 of the form-supporting unit 9, through the reducing unit 40 and through the shaft 29. At its top (see FIG. 6) the shaft 10 extends through the head 30, and is connected to the head 18 with the interposition of a rolling bearing 49. From head 18 there projects upwardly a sleeve 50 on which the upper head 33 is guided, by engagement of a cross pin 51 within a longitudinal slot 52. The sleeve 50 ends at its top with a lid 53 provided with a nozzle 54 for guiding the wire W.

In FIG. 6, rolling bearings 55 and 56 are clearly shown by which the ends of screw 22 are rotatably supported by walls 20 and 2, respectively. Also clearly visible is the toothed pulley 26 rigidly mounted on screw 22 and connected by the toothed belt 24 to the pulley 25 which is directly driven by the electric motor 23, this motor being rigidly supported by the wall 2. FIG. 6 also clearly shows the nut 21 which engages screw 22 and is carried by head 18, as well as the nut 34 rotatably mounted on the head 33 by means of bearings 57. Finally, FIG. 6 clearly shows the fluted shaft 37 driven by the electric motor 37b and rotatably supported at its upper end by wall 20 through a rolling bearing 58 and at its lower end by a sleeve 59 rigidly connected to wall 2, also in this case through rolling bearings (not shown).

Figure 9:
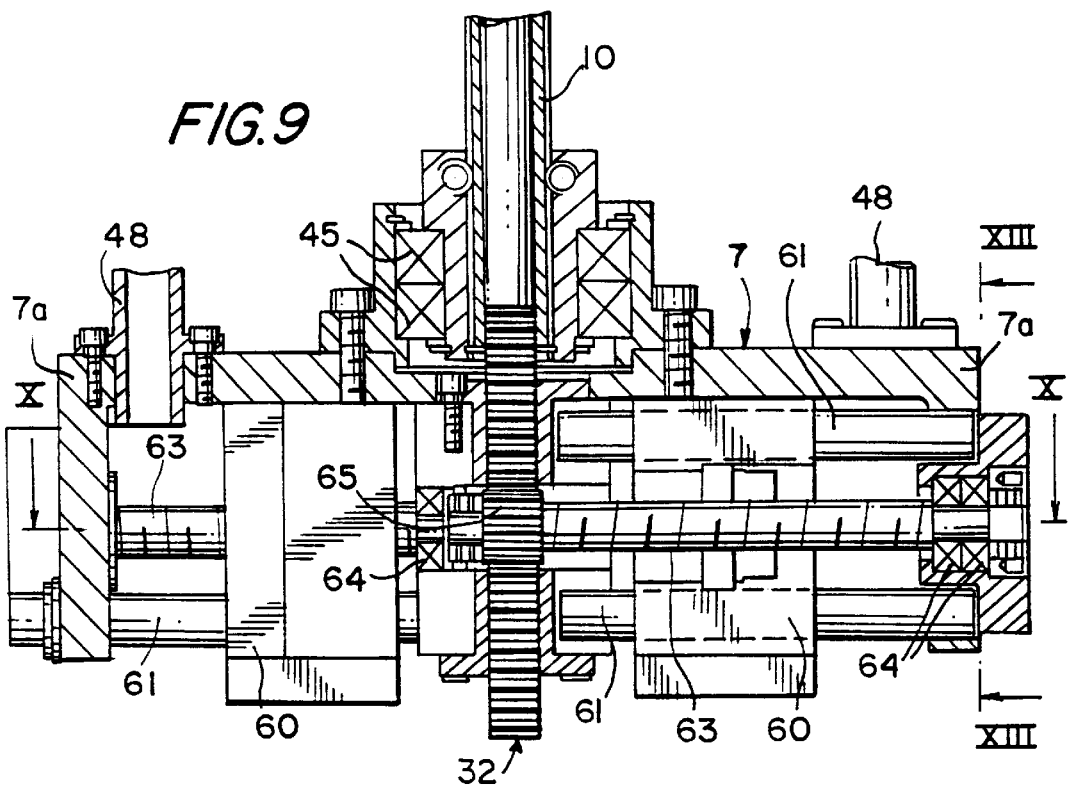
FIG. 9 is a view at an enlarged scale of the detail designated by arrow IX in FIG. 5.
Figure 10:
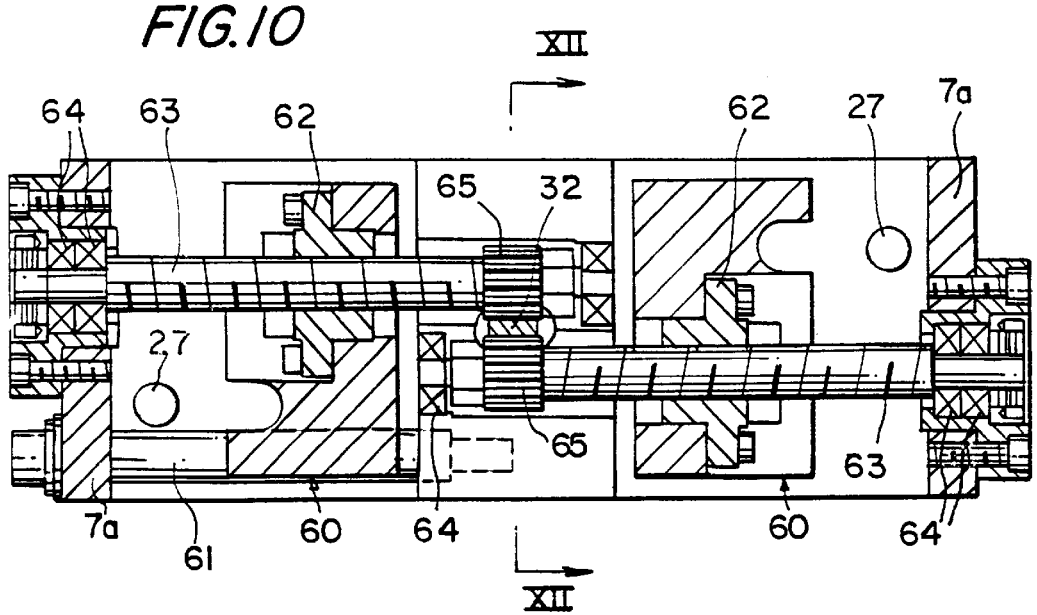
FIG. 10 is a view in cross-section taken along line X—X of FIG. 9.

Also with reference to FIG. 5, as well as to FIGS. 9, 10, and as already indicated in the foregoing, within shaft 10 there is slidably mounted a rod 32 having one end with a flattened shape having two opposite faces each shaped in form of a rack.

The two form sections 4 are connected at the top through dovetail couplings to two blocks 60 (see for example FIG. 9). Each of these blocks at its bottom has a dovetail-shaped projection 60a which is to be received within a seat of complementary shape formed in the upper surface of the respective form section 4. The two blocks 60 are slidably mounted along the horizontal direction (with reference to the drawings) orthogonal to axis 5 on guiding columns 61 extending between two end heads 7a of the supporting frame 7. The two blocks 60 include two nuts 62 (see FIG. 10) which are engaged by two screws 63. Each screw 63 is rotatably supported by the frame 7 at its ends, by bearings 64 (see FIGS. 5, 9, and 10). On the two screws 63 there are two rigidly mounted sprockets 65 which mesh with the opposite rack-like surfaces of rod 32. Because of this arrangement, an axial movement of rod 32 causes a simultaneous rotation of the two sprockets 65 and the two screws 63 therealong, which gives rise to a synchronous and symmetrical movement of the two blocks 60, which are thus compelled to move toward or away from each other, thus modifying the transverse dimension of form 3.

Figure 7:
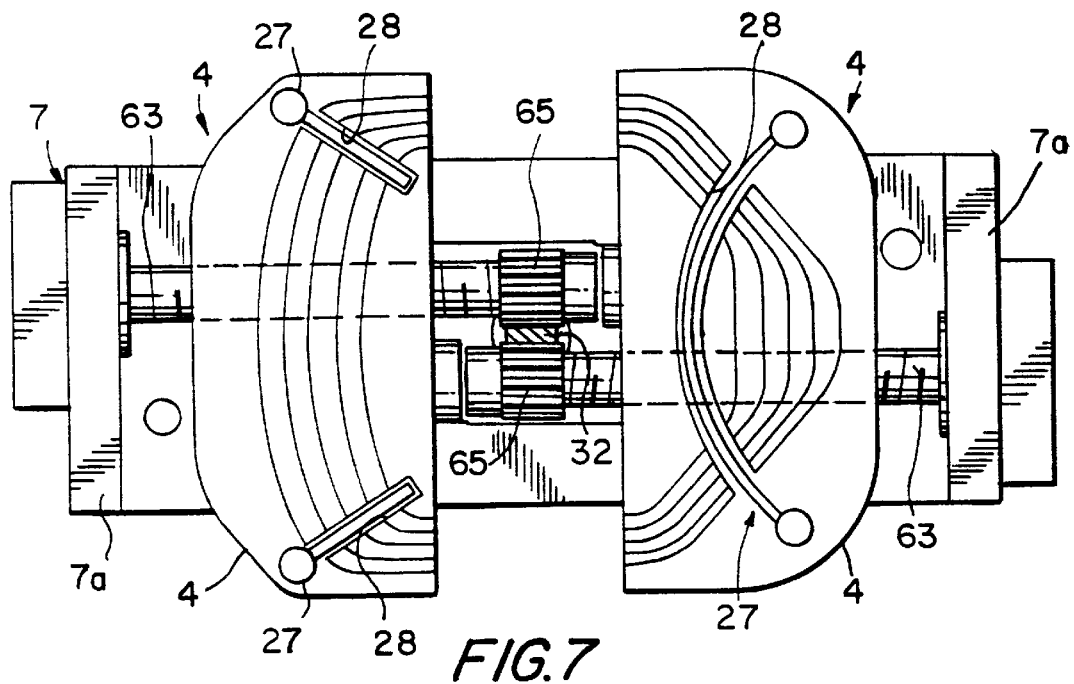
Figure 8:
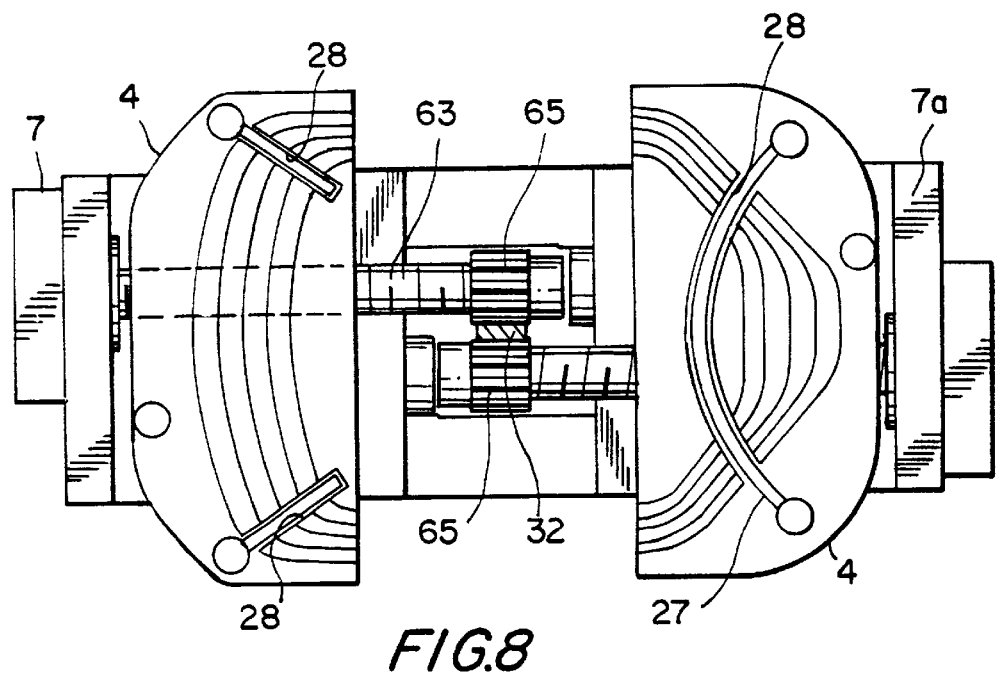
Figure 11:
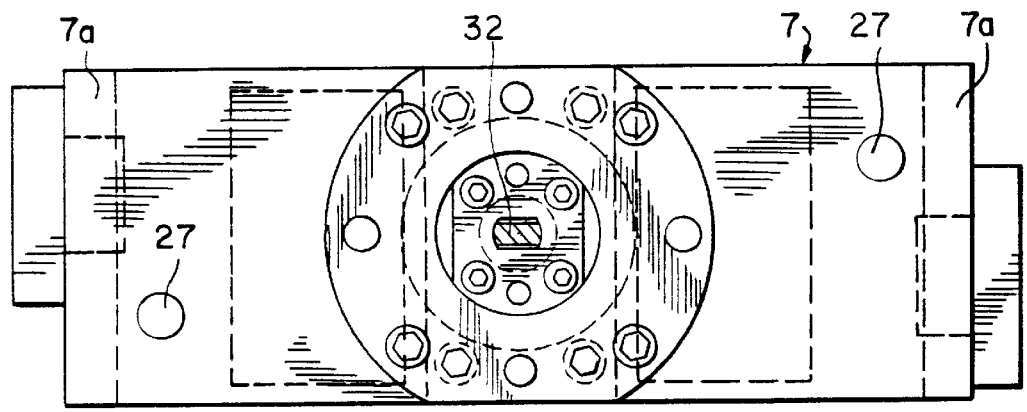
FIG. 11 is a top view of the unit of FIG. 9.
Figure 12:
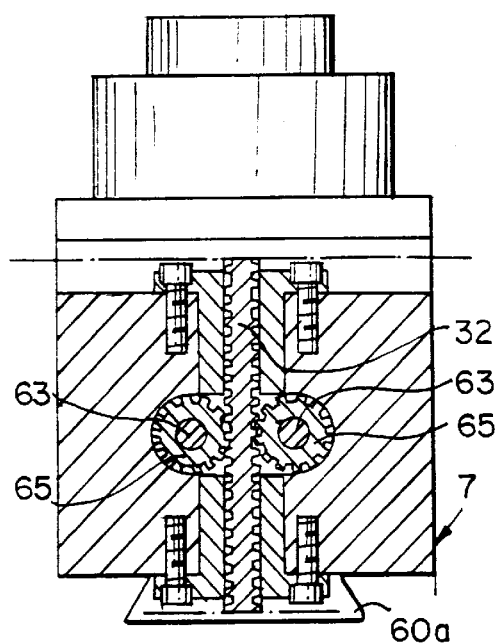
FIG. 12 is a view in cross-section taken along line XII—XII of FIG. 10.
Figure 13:
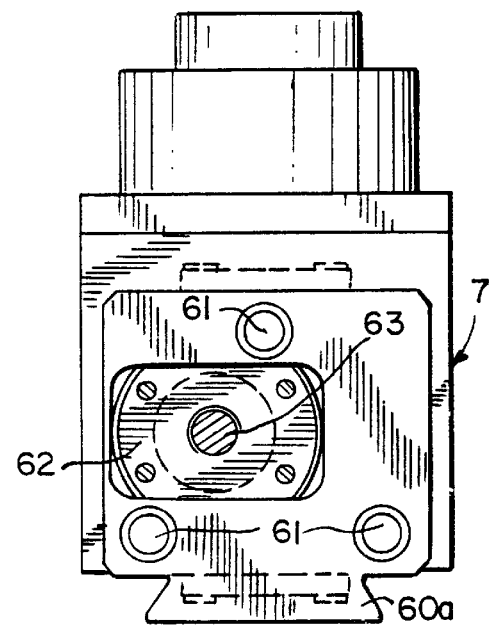
FIG. 13 is a view in cross-section taken along line XIII—XIII of FIG. 9.

FIGS. 7 and 8 are a bottom view of the form in the two operative conditions corresponding to the end positions of the form sections 4 toward and away from each other. FIG. 11 shows a top view of frame 7 supporting the form. FIG. 12 shows the rod 32 in cross-section with its two opposite rack-like faces meshing with sprockets 65.

FIG. 14 shows a cross-sectional view taken in a horizontal plane along line XIV—XIV of FIG. 1 to provide further detail of the apparatus according to the invention. In FIG. 14, reference numeral 70 designates the supporting structure which includes the horizontal wall 2 and three vertical walls 71, 72, and 73 rigidly connected to wall 2 and extending upwardly from this wall. The supporting structure 70 is guided (by guiding columns not shown in FIG. 14) along the direction designated by arrows A on a fixed supporting framework 74. The displacement of the whole supporting structure 70 along direction A relative to the fixed supporting framework 74 is obtained by rotating nut 75 which is rotatably supported by wall 71 around an axis 76 parallel to direction A, with the interposition of bearings 77. Within nut 75 there is engaged a screw 78 which has its ends rotatably supported by two wings 79 of the fixed supporting framework 74, through bearings 80. A rotation of nut 75 causes screwing or unscrewing of this nut 78, which is locked in rotation within a sleeve 81 secured to wing 79, by a cross pin 82 provided with a knob 83.

The rotation of nut 75 is driven by a gear 84 which meshes with a gear 85 rigidly connected to nut 75. The gear 84 is also shown in FIG. 1 and is mounted on the fluted shaft 37. Therefore, when the electric motor 37b is actuated to cause the relative spacing between the two form sections 4 to be adjusted, the rotation imparted thereby to the fluted shaft 37 also causes a corresponding translation of the supporting structure 70 along direction A, because of the transmission constituted by gear 84, gear 85 and nut 75 which screws or unscrews on screw 78. This movement is desired since the inserting device which is to receive the coils expelled from form 3 must be located below form 3 with its axis spaced from axis 5 and aligned with a peripheral area of the form. Therefore, if the form is enlarged or reduced, it is then necessary to translate both form sections by the same adjustment length, to bring the above-mentioned peripheral area of the form back in axial alignment with the inserting device. This result is obtained automatically with the transmission which has been described in the foregoing.

Furthermore, at any time it is possible to manually control an adjustment of the position of the supporting structure 70 along direction A (FIG. 14) by a wheel 86 which is rotatably connected to screw 78 and is able to cause, when manually actuated, a rotation of screw 78, after pin 82 has been unlocked. The rotation imparted manually to screw 78 causes a corresponding translation of nut 75 and the whole supporting structure 70, carrying the structure shown in FIG. 1.

As is clearly apparent from the foregoing description, the apparatus according to the invention is able to provide windings for stators of dynamoelectric machines in the conventional way, by rotation of a winding unit 11 around a form 3 comprising two form sections 4. The motor 15 drives rotation of the winding unit 11, whereas a fluid 31 controls movement of a head 30 connected to the ejector members 27 which attend to discharging the coil thus formed on the inserting device.

The form 3 can be moved axially along axis 5 to form coils on the various stepped portions of the form 3. This axial movement is obtained by actuating the electric motor 23 which causes a rotation of the screw 22 and a resulting translation of the head 18 carrying the nut 21 engaged by screw 22. The axial movement of head 18 is transmitted to shaft 10 which is connected to the form supporting unit 9. During the stages of axial movement of the form 3, the head 33 is moved synchronously with head 18, since the nut 34 carried thereon is caused to move by the rotation of the screw 22. Therefore, no relative movement between rod 32, connected to head 33, and the form takes place, so that the form keeps a predetermined configuration.

When one desires to adjust the configuration of the form, electric motor 37b must be actuated to rotate the gear pair 35, 36 and the nut 34 carried by head 33. The latter is thus compelled to move axially, whereas head 18 remains motionless, since the screw 22 does not rotate, because the electric motor 23 is inactive. Therefore, there is an axial movement of the rod 32 relative to the form, which causes a movement of the two blocks 60 carrying the form sections 4 toward and away from each other.

The above-mentioned adjustment movement of the two form sections 4 can be obtained even during the winding forming operation, while the electric motor 15 is active and the winding unit 11 is rotating. In this manner, it is thus possible to obtain windings having turns of variable length, which may give new possibilities to designers of dynamo-electric machines in order to obtain better performance or saving of wire. When the spacing between the two form sections 4 is adjusted, the gear 84 causes a simultaneous translation of the whole unit of the apparatus shown in FIG. 1, due to the transmission shown in FIG. 14, as described in the foregoing.

Naturally, while the principle of the invention remains the same, the details of construction and the embodiments may widely vary with respect to what has been described and illustrated purely by way of example, without departing from the scope of the present invention.

What is claimed is:

1. Apparatus for forming a coil, which includes a plurality of turns of wire, for subsequent application to a stator of a dynamoelectric machine comprising:
    a source of wire;
    a form defining an annular wire receiving region, the form comprising two form sections that are movable toward and away from each other;
    first structure configured to produce relative motion between the source of wire and the form so that wire from the source wraps around the wire receiving region to produce a succession of turns of wire for the coil; and
    second structure configured to selectively modify the form to change the annular distance around the wire receiving region during formation of the succession of turns of wire so that at least some turns in the succession have different length than other turns in the succession.

2. The apparatus defined in claim 1 wherein the second structure comprises:
    a remotely controlled actuator configured to selectively modify the form to change the annular distance around the wire receiving region during formation of the succession of turns of wire.

3. The apparatus defined in claim 2 wherein the actuator comprises:
    a motor.

4. The apparatus defined in claim 1 wherein the first structure is further configured to rotate the source of wire annularly about the form.

5. The apparatus defined in claim 4 wherein the first structure is further configured to prevent the form from rotating with the source of wire.

6. The apparatus defined in claim 1 wherein the form has a form axis about which the wire receiving region is annular, and wherein the two form sections of the form are movable by the second structure, toward and away from one another along a direction that is substantially orthogonal to the form axis, each of the form sections defining a respective portion of the annular wire receiving region.

7. The apparatus defined in claim 6 further comprising:
    form translating structure configured to selectively move the form substantially parallel to the form axis.

8. The method of forming a coil, which includes a plurality of turns of wire, for subsequent application to a stator of a dynamoelectric machine comprising:
    providing a source of wire;
    providing a form defining an annular wire receiving region, the form comprising two form sections that are movable toward and away from each other;
    producing relative motion between the source of wire and the form so that wire from the source wraps around the wire receiving region to produce a succession of turns of wire for the coil; and
    modifying the form to change the annular distance around the wire receiving region during formation of the succession of turns of wire so that at least some turns in the succession have different length than other turns in the succession.

9. The method defined in claim 8 wherein the producing comprises:
    rotating the source of wire annularly about the form, while preventing the form from rotating with the source of wire.

10. The method defined in claim 8 wherein the form has a form axis about which the wire receiving region is annular, wherein the two form sections of the form are on respective opposite sides of the form axis, each form section defining a respective portion of the annular wire receiving region, and wherein the modifying comprises moving the two form sections relative to one another along a direction that is substantially orthogonal to the form axis.

11. An apparatus for forming a winding for a stator of a dynamoelectric machine, comprising;
    a supporting structure,
    a form carried by the supporting structure, on which a wire is to be wound for forming the winding,
    a rotating unit, rotatably supported by the supporting structure around a form central axis, for winding the wire around said form in order to form the winding,
    wherein said form comprises two form sections that are movable toward and away from each other along a direction orthogonal to the form axis,
    characterized in that said apparatus further includes motorized means for controlling the relative displacement of the two form sections toward and away from each other, said motorized means being able to be activated while the winding unit is being rotated.

12. Apparatus for forming turns of wire for subsequent application to a stator of a dynamoelectric machine comprising:
    a form defining an annular wire receiving region having a plurality of subregions of respective different annular sizes spaced along a form axis about which the wire receiving region is annular, the form including a plurality of parts that are movable toward or away from one another transverse to the form axis to change the annular sizes of the subregions;

a source of wire mounted for rotation annularly about the annular wire receiving region to wind turns of wire on any one of the subregions during movement of the form parts toward or away from one another transverse to the form axis to thereby produce turns of different lengths;

a shaft structure including a first substructure for supporting the form and a second substructure movable relative to the first substructure for producing movement of the form parts toward or away from one another transverse to the form axis;

a first actuator mechanism for selectively moving the first substructure to position any one of the subregions adjacent to the source of wire to enable the source of wire to wind turns of wire on that subregion;

a second actuator mechanism for selectively moving the second substructure relative to the first substructure to produce movement of the form parts toward or away from one another transverse to the form axis; and a linkage between the first and second actuator mechanisms for causing the second substructure to move with the first substructure in response to the first actuator mechanism when the second actuator mechanism is not operating to move the second substructure relative to the first substructure.

13. The apparatus defined in claim 12 wherein the first actuator mechanism comprises a rotatable screw threadedly connected to the first substructure, and wherein the linkage comprises a selectively operable threaded connection between the screw and the second substructure.

14. The apparatus defined in claim 13 wherein the selectively operable threaded connection is operable by the second actuator.

15. The apparatus defined in claim 12 wherein the shaft structure is substantially aligned with and movable along the form axis.

16. The apparatus defined in claim 15 wherein the second substructure is movable relative to the first substructure substantially parallel to the form axis to produce the movement of the form parts toward or away from one another transverse to the form axis.

17. The apparatus defined in claim 12 wherein the second substructure comprises an inner member which is substantially surrounded by the second substructure.

* * * * *